United States Patent [19]

Rich et al.

[11] 4,029,921

[45] June 14, 1977

[54] VACUUM-TYPE CIRCUIT INTERRUPTER WITH TWO SETS OF CONTACTS ELECTRICALLY IN PARALLEL

[75] Inventors: Joseph A. Rich, Schenectady, N.Y.; Joseph C. Sofianek, Broomall, Pa.

[73] Assignee: General Electric Company, Philadelphia, Pa.

[22] Filed: July 1, 1975

[21] Appl. No.: 592,303

[52] U.S. Cl. .............................. 200/144 B; 313/217

[51] Int. Cl.$^2$ ........................................ H01G 33/66

[58] Field of Search ........... 200/144 B, 146 R, 145; 313/217

[56] References Cited

UNITED STATES PATENTS

| | | | |
|---|---|---|---|
| 3,185,799 | 5/1965 | Greenwood et al. | 200/144 B |
| 3,321,598 | 5/1967 | Streater | 200/144 B |
| 3,405,245 | 10/1968 | Ito et al. | 200/144 B |
| 3,471,734 | 10/1969 | Rich | 200/144 B |
| 3,679,474 | 7/1972 | Rich | 313/217 |
| 3,818,166 | 6/1974 | Emmerich et al. | 200/144 B |

*Primary Examiner*—Robert S. Macon

*Attorney, Agent, or Firm*—William Freedman

[57] ABSTRACT

A vacuum-type circuit interrupter comprises two pluralities of rod electrodes positioned to form a ring of electrodes in which the electrodes of the first plurality interleave with those of the second plurality and are spaced circumferentially of the ring from the immediately adjacent electrodes of the second plurality. The rod electrodes of said first plurality are mounted on and electrically connected to a first conductive end cap of the interrupter. The rod electrodes of the second plurality are mounted on and electrically connected to a second conductive end cap of the interrupter.

First conductive support structure extends transversely of the rod electrodes and is attached to the distal ends of predetermined rod electrodes of said second plurality. A first generally stationary contact is supported on said first support structure in a position intermediate the locations at which the first support structure is attached to said predetermined rod electrodes of said second plurality. Second conductive support structure extends transversely of the rod electrodes and is attached to the distal ends of predetermined rod electrodes of said first plurality. A second generally stationary contact is supported on said second support structure in a position intermediate the locations at which the second support structure is attached to said predetermined rod electrodes of said second plurality. First and second movable contacts are provided for respectively engaging the first and second generally stationary contacts. A first movable contact rod on which the first contact is mounted extends in sealed relationship through said first metal end cap. A second movable contact rod on which said second contact is mounted extends in sealed relationship through said second metal end cap. The two pairs of engageable contacts are electrically connected in parallel with each other while the interrupter is closed.

10 Claims, 3 Drawing Figures

VACUUM-TYPE CIRCUIT INTERRUPTER WITH TWO SETS OF CONTACTS ELECTRICALLY IN PARALLEL

BACKGROUND

This invention relates to an electric circuit interrupter of the vacuum type and, more particularly, to a circuit interrupter of this type which comprises two sets of relatively movable contacts electrically connected in parrallel for carrying continuous current through the interrupter.

In most vacuum interrupters, the force required to hold a pair of separable contacts in engagement during the passage of high current therethrough varies directly with the square of the current. It has been recognized that this force can be reduced by providing a plurality of sets of contacts electrically connected in parallel for sharing the total current through the interrupter. One way of constructing such an interrupter is to mount the movable contact of each pair on the usual long, slender movable contact rod and to arrange these movable contact rods in close side-by-side relationship. A problem involved in such an arrangement is that the high magnetic forces developed between the movable contact rods when high currents flow therethrough tend to force the rods together, making it difficult to properly guide and operate the contact rods.

One solution to this problem is disclosed and claimed in co-pending application Ser. No. 579,122-Kurtz and Sofianek, filed May 19, 1975, now Pat No. 3,996,438, and assigned to the assignee of the present invention. In that application, the two electrically-parallel pairs of contacts are located at opposite ends of the envelope of the interrupter, and current is carried physically past each contact pair via an electrically-parallel conductive path extending through the other pair. Each of these parallel conductive paths is constituted, in part, by a single one of the rod electrodes of a rod-array type of electrode arrangement of the general type disclosed and claimed in U.S. Pat. No. 3,679,474-Rich, assigned to the assignee of the present invention. On the distal end of this single rod electrode, means is provided for mounting the stationary contact of the pair of relatively movable contacts in the parallel path.

A problem involved in such a design is that high magnetic forces of attraction can be developed between the movable contact rod and the parallel single rod electrode in the region where these parts are in proximity. In the aforesaid Kurtz and Sofianek application, this problem is solved by providing around each movable contact rod a conductive tube that is electrically connected in series with the aforesaid single rod electrode. This tube distributes the current flowing through the single rod electrode circumferentially about the movable contact rod surrounded by the tube, thereby providing a coaxial conductor arrangement wherein relatively low forces are present between the conductors.

SUMMARY

An object of our invention is to provide an interrupter design of generally the type disclosed in the aforesaid Kurtz and Sofianek application wherein a conductive tube is not required around the movable contact rod in order to limit the transversely-directed forces acting on the movable contact rod during high momentary currents.

As pointed out hereinabove, in the Kurtz and Sofianek application the stationary contact of each contact pair is mounted on the distal end of a single rod electrode of a rod array type of electrode arrangement. It may be necessary to locate the stationary contact in a location radially offset from the longitudinal axis of the single rod electrode by a relatively great distance. Such radially-offset mounting on the distal end of a single rod electrode is not an ideal arrangement from a mechanical strength viewpoint. More specifically, closing forces on such contacts heavily load the single supporting rod electrode in cantilever bending and also subject the mounting element between the contacts and the supporting rod electrode to relatively severe cantilever bending stresses.

Accordingly, another object is to provide, for a rod-array type of vacuum interrupter having parallel connection sets of contacts near opposite ends of the interrupter, means for mounting the contacts on the rods in such a way that the rods and the contact mounting can easily withstand high closing forces on the contacts.

Another object is to mount the stationary contact structure of each set of relatively-movable contacts in such a manner that the closing forces on each set are distributed between a plurality of the rod electrodes.

In carrying out the invention in one form, we provide a vacuum interrupter comprising a highly evacuated envelope that has metal end caps at its opposite ends. A first plurality of rod electrodes within the envelope are mounted on the first end cap and are electrically connected thereto when the interrupter is open. A second plurality of rod electrodes within the envelope are mounted on the second end cap and are electrically connected to the second end cap when the interrupter is open. The first and second pluralities of electrodes are positioned so as to form a ring of electrodes within the envelope. The electrodes of the first plurality interleave with those of the second plurality and are spaced circumferentially of the ring from the immediately-adjacent electrodes of the second plurality, whereby inter-electrode gaps are defined between juxtaposed interleaving electrodes of said ring. Extending transversely of the rod electrodes and attached to the distal ends of predetermined rod electrodes of said second plurality, we provide first conductive support structure on which a first generally stationary contact is supported in a position intermediate the locations at which said first support structure is attached to said predetermined rod electrodes of said second plurality. Extending transversely of the rod electrodes and attached to the distal ends of predetermined rod electrodes of said first plurality, we provide second conductive support structure on which a second generally stationary contact is supported in a position intermediate the locations at which said second support structure is attached to said predetermined rod electrodes of the first plurality. The first and second stationary contacts are disposed in positions spaced longitudinally of the longitudinal axis of the ring. First and second movable contacts are provided within the envelope for respectively engaging the first and second generally stationary contacts. A first movable contact rod on which said first contact rod is mounted extends in sealed relationship through the first metal end cap. A second movable contact rod on which said second contact is mounted extends in sealed relationship through said second metal end cap. The two pairs of engageable contacts are electrically connected in parallel with each other while the interrupter is closed.

BRIEF DESCRIPTION OF DRAWINGS

For a better understanding of the invention, reference may be had to the accompanying drawings, wherein.

DETAILED DESCRIPTION OF PREFERRED EMBODIMENT

Figure 1:
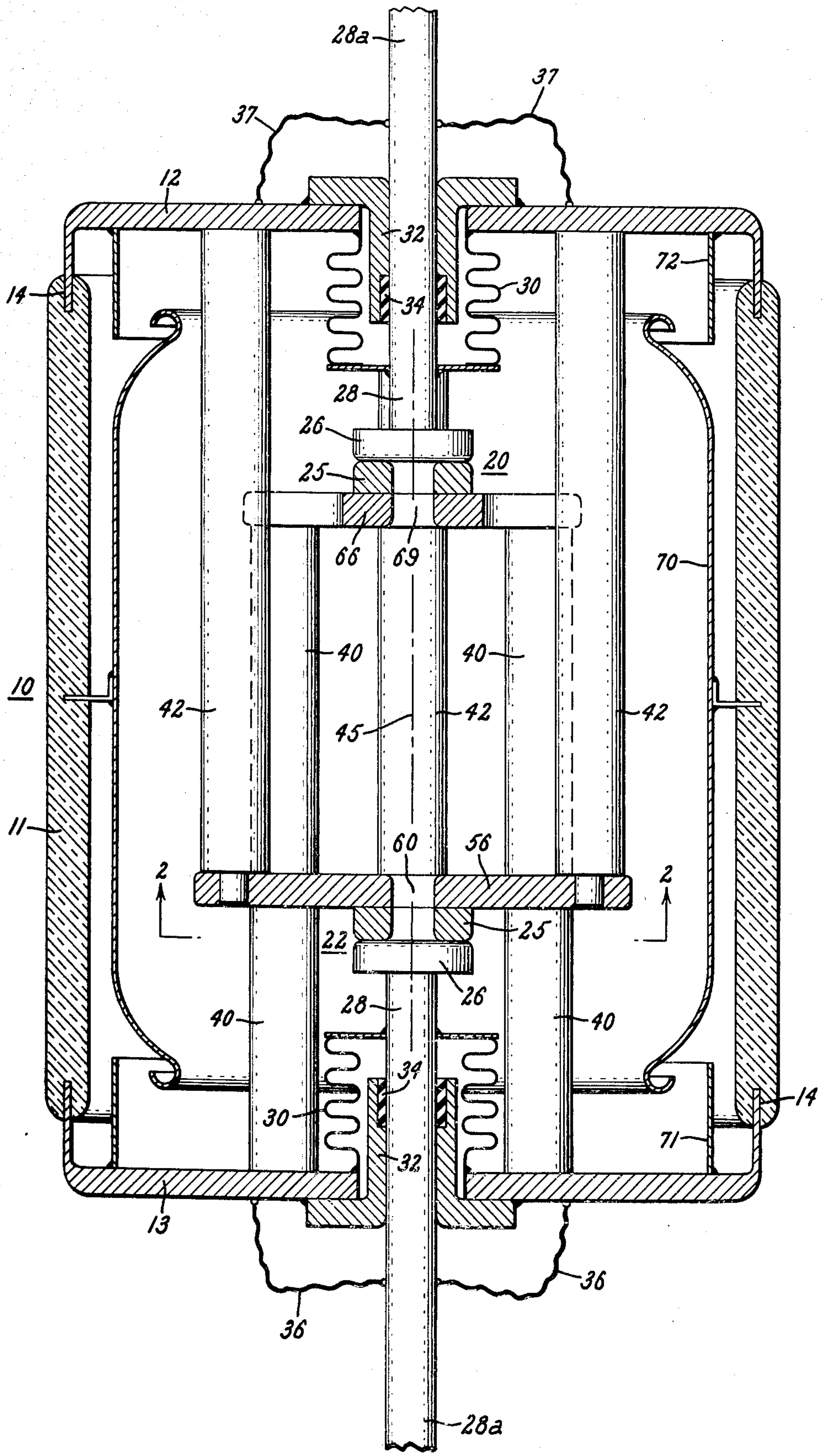
FIG. 1 is a side-elevational view, mostly in section, showing a vacuum interrupter embodying one form of the invention.

Referring now to FIG. 1, the illustrated vacuum interrupter comprises a highly evacuated envelope 10 that comprises a tubular housing 11 of insulating material and a pair of metal end caps 12 and 13 disposed at opposite ends of the housing and sealed thereto by conventional seals 14.

The interrupter comprises two pairs 20 and 22 of separable contacts electrically connected in parallel with each other in a manner that will soon become apparent. Contact pair 20 is located near the upper end cap 12, and contact pair 22 is located near the lower end cap 13. Each contact pair comprises a generally stationary contact 25, supported in a manner soon to be described, and a movable contact 26 vertically movable into and out of engagement with stationary contact 25. The movable contact 26 of each pair is brazed to the inner end of a vertically-movable conductive contact rod 28 that extends through the adjacent end cap.

For providing a seal between each contact rod 28 and the envelope, an elongated metal bellows 30 is provided for each contact rod. Each of these bellows has one end joined to the contact rod by a suitable vacuum-tight joint and its opposite end joined to the adjacent end cap by another suitable vacuum-tight joint. The bellows allows the contact rod to be moved vertically without impairing the vacuum inside the envelope.

To assist in guiding each contact rod 28 for substantially straight-line motion along its longitudinal axis, a tubular guide 32, preferably of non-magnetic material, is provided around each contact rod. This guide 32 has a radially extending flange that is fixed to the adjacent end cap. At the inner end of guide 32, there is a sleeve bearing 34, preferably of polytetrafluoroethylene, fixed to the guide and slidably receiving contact rod 28.

Each movable contact rod 28 is electrically connected to the end cap through which it extends by suitable flexible conductive braid. Such braid is schematically shown at 36 and at 37. The purpose of this braid will soon appear more clearly.

The interrupter also includes an interleaving rod electrode arrangement of the general type disclosed and claimed in the aforesaid Rich U.S. Pat. No. 3,679,474. This arrangement comprises a first plurality of rod electrodes 40 mounted on and electrically connected to lower end cap 13 and a second plurality of rod electrodes 42 mounted on and electrically connected to upper end cap 12. The rod electrodes 40 and 42 are positioned so as to form a generally circular ring of electrodes concentrically surrounding the central longitudinal axis 45 of the interrupter. The upwardly-projecting electrodes 40 interleave with and longitudinally overlap the downwardly-projecting electrodes 42 and are spaced circumferentially of the ring from the immediately-adjacent electrodes 42. Since alternate electrodes are connected to opposite end caps, the juxtaposed electrodes are considered to alternate in polarity when the interrupter is open.

Figure 2:
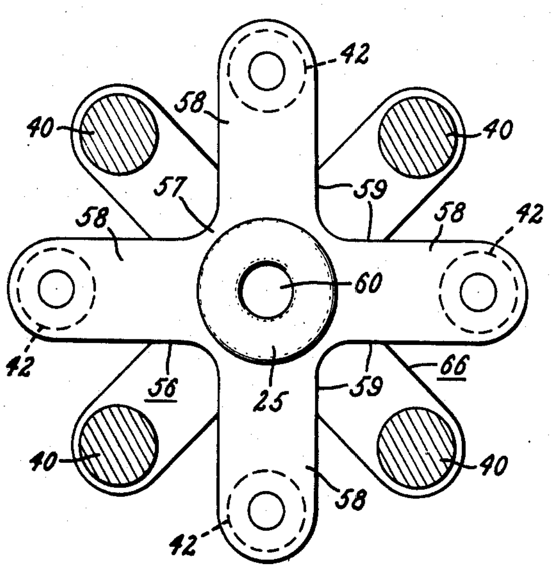
FIG. 2 is a sectional view along the line 2-2 of FIG. 1.

For supporting the stationary contact 25 of the lower pair 22 of contacts, a spider 56 of highly conductive metal is provided at the lower, or distal, ends of the downwardly projecting rod electrodes 42. As shown in FIG. 2, this spider comprises a central portion 57 and four arms 58 radiating outwardly therefrom. Contact 25 is suitably brazed to the central portion 57 of the spider, and the outer ends of arms 58 are suitably brazed to the lower ends of the downwardly projecting rod electrodes 42. The stationary contact 25 is an annular member having a hole through its center, and the central portion 57 of the spider has a hole therein aligned with the hole in the annular contact, the two holes forming a centrally-disposed passage 60, the purpose of which will soon appear more clearly.

The stationary contact 25 of the upper pair 20 of contacts is supported on the upper ends of the upwardly-projecting rod electrodes 40 in substantially the same way as the lower stationary contact is supported on the downwardly-projecting rod electrodes 42. The spider 66 of this upper support is of the same configuration as the lower spider 56. A passage 70, corresponding to passage 60 in the lower spider, extends through the upper spider and stationary contact 25 supported thereon.

It should be noted that the upwardly-projecting rod electrodes 40 extend past the lower spider 56 through large indentations 59 in the periphery of the spider and are sufficiently spaced from the spider, as shown in FIG. 2, to provide ample electrical clearance between these parts, which are at opposite polarities when the interrupter is open. Similarly, the downwardly-projecting rod electrodes 42 extend past the upper spider 66 with sufficient electrical clearance to withstand the voltage present between these parts.

The outer ends 28a of the two movable contact rods 28 may be thought of as the terminals of the interrupter. When the interrupter is closed, current entering through lower terminal 28a flows upwardly through the interrupter via either of two electrically parallel paths. One path is through the series combination of: lower contact rod 28, lower contact pair 22, spider 56, the four rod electrodes 42 in parallel, and parts 12, and 37. The other path is through the series combination of: parts 36 and 13, the four rod electrodes 40 in parallel, spider 66, upper contact pair 20, and the upper contact rod 28. These two parallel paths are constituted by substantially identical parts, as a result of which their impedances are substantially equal, thus forcing the total current to divide substantially equally between them. Since only about half the total current passes through each pair of contacts as compared to an interrupter where there is only a single pair of contacts, the force required to hold each of our sets of contacts closed against the magnetic forces developed by a given total current through the interrupter is only about one-fourth that required in the case of the interrupter with a single pair of contacts. This means the total force required on our two sets of contacts is only about one-half that required in an interrupter with a single set of contacts. This substantial reduction in force requirements is a distinct advantage in that it permits a substantial reduction in the size of the required closing mechanism.

For effecting opening of the interrupter, the two movable contact rods 28 are driven substantially simultaneously outwardly of the interrupter from their illustrated closed positions to effect substantially simultaneous contact-separation at the two sets of contacts 20 and 22. Closing is effected after such an opening operation by simultaneously returning the movable contact rods 28 to their illustrated positions to produce substantially simultaneous contact-engagement at the two contact pairs 20 and 22. The linkage for effecting such contact-rod motion is not shown since it can be of any suitable conventional design, e.g., that illustrated in FIG. 2 of application Ser. No. 499,740-Crouch et al, filed Aug. 22, 1974 now Pat. No. 3,914,568, and assigned to the assignee of the present invention.

During a circuit-interrupting operation, the substantially simultaneous contact-separation occurring at the two contact pairs 20 and 22 normally results in an arc being established between the contacts 25, 26 of each pair. Ionized arcing products from these arcs are quickly propogated into the gaps between the adjacent rod electrodes 40 and 42, causing these inter-electrode gaps to break down electrically, thus forming diffuse arcs between juxtaposed pairs of rod electrodes. These diffuse arcs extend circumferentially of the envelope and are capable of carrying relatively high currents without the formation of anode spots, as is explained in the aforesaid Rich U.S. Pat. No. 3,679,474. Although current may sometimes continue to flow through the inter-contact gaps after arcs are established between the rod electrodes, this inter-contact current is only a small percentage of the total current and does not prevent interruption at an early current zero.

To assure prompt breakdown of the inter-electrode gaps following arc-initiation at the contact pairs 20 and 22, it is important that there be good communication between the inter-contact gaps and the inter-electrode gaps so that ionized arcing products from the inter-contact arcs can be quickly propogated into the inter-electrode gaps. The passageways 60 and 69 extending through the stationary contact structures into the central region of the interrupter contribute to such good communication. In this respect, arcing products from arcs between the contacts 25, 26 can flow inwardly through these passages and diffuse radially outwardly into the inter-electrode gaps. It should also be apparent from FIG. 2 that the large indentations in the peripheries of spiders 56 and 66 provide relatively unrestricted passages through which arcing products can flow between the inter-contact gap and the inter-electrode gaps to promote the desired prompt breakdown of the inter-electrode gaps.

For protecting the insulating housing 11 from being coated by arc-generated metallic particles, a plurality of tubular metal shields 70, 71, and 72 are provided. Central shield 70 is electrically isolated from the end caps 12 and 13, and shields 71 and 72 are end shields electrically connected to the end caps. These shields act in a known manner to intercept and condense arc-generated metallic vapors before they can reach the insulating housing 11.

Each of the rods 40 and 42 is preferably a composite member comprising a tubular shell of vacuum-melted steel and a copper core filling the shell. The steel shell is relied upon for high mechanical strength and high dielectric strength; and the copper core, which has high electrical and thermal conductivity, is relied upon primarily for carrying continuous currents through the rod and for heat dissipation purposes. A suitable steel is one of those disclosed and claimed in U.S. Pat. No. 3,769,538-Harris, assigned to the assignee of the present invention. In another form of the invention, each rod electrode comprises a copper shell and a core of steel. The material of the shell, in either form, should be relatively gas-free so as to substantially prevent the evolution of gases therefrom when exposed to arcing.

As pointed out hereinabove, an interrupter having side-by-side parallel connected movable contact rods is subject to the problem that under high current conditions, high magnetic forces are developed between the adjacent movable contact rods, tending to force the rods together and deform them, making it difficult to guide and properly operate the movable contact rods. In the aforesaid Kurtz and Sofianek application, this problem is overcome by locating the two contact pairs at opposite ends of the interrupter and by carrying current to one contact pair past the other contact pair via a conductive tube surrounding the movable contact rod. We are able to dispense with such a tube because we carry the current past each contact pair via a plurality of rod electrodes distributed generally symmetrically about the periphery of the movable contact rod. For example, the current flowing past the lower contact pair 22 flows through the four rod electrodes 40 in the region of the movable contact rod 28. Since these rod electrodes 40 are generally symmetrically located about the periphery of the contact rod 28, as will be especially apparent from FIG. 2, and since the contact rods carry substantially equal currents, there will normally be little net transversely-acting force on the movable contact rod. The magnetic attraction between the movable contact rod 28 and each rod electrode 40 is balanced by a substantially equal and opposite magnetic attraction between the contact rod and a rod electrode 40 in a location diametrically opposed to that of the first rod electrode. The net transversely-acting magnetic force present on the upper movable contact rod 28 is correspondingly limited to a low value since rod electrodes 42 carrying substantially equal currents symmetrically surround this upper movable contact rod.

In the region where the rod electrodes 40 and 42 overlap, the current paths through adjacent rod electrodes are in close proximity, but the magnetic attraction force between adjacent rods is not very great because each of these current paths is carrying only one-eighth of the total current. There is, however, an azimuthal magnetic field encircling the whole rod assembly which interacts with the current flow in the rods to produce a radially inward force on the rods. This radially inward force, which can be termed a magnetic wrap-around force, can be substantial at high currents. The rod electrodes 42 and 40 are able to effectively resist these magnetic forces because each of the spiders 56 and 66 across their distal ends acts as a brace opposing displacement of the rod electrodes by these attractive forces and also because each of the rods, as mentioned hereinabove, includes a shell, or a core, of high strength steel that is highly resistant to deformation.

When the interrupter is in its closed position shown, relatively high hold-closed forces must be exerted on the two movable contacts 26 in order to hold the contacts closed against high currents, e.g., momentary currents. These hold-closed forces are, of course, transmitted to the stationary contacts and their supporting structure. The presence of the spiders 56 and 66 imparts a desirably high amount of rigidity to this supporting structure. These spiders tie the rod electrodes together, eliminating the cantilever-beam type construction of the aforesaid Kurtz and Sofianek application and providing, in effect, a box-like framework. Since each spider is supported on the rods at its four, diametrically-opposed ends, it too is rigidified as compared to the cantilever-beam type contact supports of the aforesaid Kurtz and Sofianek application.

While we no longer need a conductive tube around the movable contact rod for force-reduction purposes as in the aforesaid Kurtz and Sofianek application, it is sometimes desirable to include such a tube for another purpose. More specifically, such a tube, if it surrounds the contacts, can advantageously be used to intercept the relatively large molten particles generated by arcing at the contacts, thereby protecting the rest of the interrupter from such particles.

Figure 3:
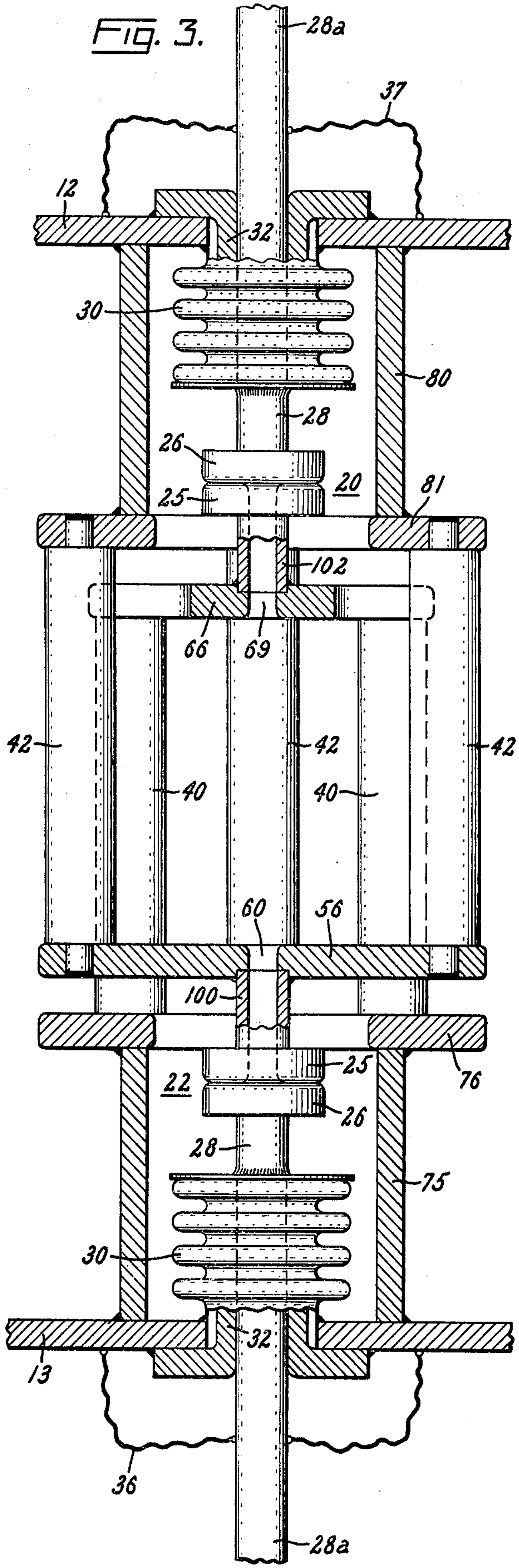
FIG. 3 is a sectional view of a portion of an interrupter embodying a modified form of the invention.

FIG. 3 shows an embodiment of the invention that includes such a tube around each set of contacts. The lower tube is designated 75 and the upper tube 80. The upwardly-projecting rod electrodes 40, instead of being mounted directly on the lower end cap, are mounted on the lower tube 75 through an annular flange 76 at the top of the tube. The downwardly-projecting rod electrodes 42 are similarly mounted on the upper tube 80 through a flange 81.

To aid in locating the contact pairs within their respective tubes 75 and 80, the stationary contact 25 of each pair is mounted on a short conductive rod 100 that extends between the stationary contact and the spider 56 or 66 on which it is mounted. This rod 100 projects from the spider into its associated tube 75 or 80 and is brazed to the spider at one end and to the stationary contact at the other end.

The inner end of each of the tubes 75 and 80 is open so that sufficient communication is present between each inter-contact gap and the inter-electrode gaps to force prompt initiation of arcs across the inter-electrode gaps following contact-separation. To facilitate such communication, passageways 60 and 70 are respectively provided in the stationary rods 100 and 102.

The lower ends of the rod electrodes 42 are interconnected by a conductive spider 56 corresponding to the spider 56 of FIG. 1. The upper ends of the rod electrodes 40 are interconnected by a conductive spider 66 corresponding to the spider 66 of FIG. 1. These spiders of FIG. 3 impart rigidity to their associated rod structures in the same manner as their counterparts function in FIG. 1.

The overall operation of the interrupter of FIG. 3 is generally the same as that of FIG. 1, and further description of such operation is therefore considered unnecessary.

One noteworthy point with respect to the interrupter of FIG. 3 is that since all the rods 42 carry current, the current in the upper tube 80 is distributed more uniformly about the circumference of the tube with less non-uniformity at its ends than is the case when only one rod electrode normally carries current, as in the aforesaid Kurtz and Sofianek application. This greater uniformity of currect distribution further reduces any transversely-acting magnetic forces on the surrounded movable contact rod 28. The same conditions as described above with respect to upper tube 80 are present with respect to the lower tube 75 since all of the rod electrodes 40 carry current, thus contributing to more uniform distribution of current in the lower tube 75.

The use of a metal tube around the contacts of an inter-leaving rod-electrode vacuum interrupter for intercepting and condensing large molten particles generated by inter-contact arcing before the particles can deposit on the rod electrodes is disclosed and claimed more broadly in Application Ser. No. 589,892-Rich, filed June 24, 1975, and assigned to the assignee of the present invention. The invention of said Rich application was made prior to the present invention and, therefore, we make no claim herein to said broad invention of Rich.

It is to be understood that the drawings have been somewhat simplified to facilitate an understanding of the invention. For example, certain details have been omitted which are needed to facilitate assembly of the disclosed interrupters. More specifically, each of the end caps 12 and 13, though shown as a single part, will typically be made from two or more concentric parts suitably joined together after the internal parts of interrupter have been assembled and located.

While we have shown and described a particular embodiment of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

1. In a vacuum-type circuit interrupter:

a. a highly evacuated envelope comprising an insulating housing and first and second metal end caps at opposite ends of said housing, b. a first plurality of rod electrodes within said envelope mounted on said first end cap and electrically connected to said first end cap when the interrupter is open, c. a second plurality of rod electrodes within said envelope mounted on said second end cap and electrically connected to said second end cap when the interrupter is open, d. said first and second pluralities of electrodes being positioned so as to form a ring of electrodes within said envelope, the electrodes of said first plurality interleaving with and longitudinally overlapping the electrodes of said second plurality and being spaced circumferentially of said ring from the immediately adjacent electrodes of said second plurality, said electrodes alternating in polarity about said ring when the interrupter is open, whereby inter-electrode gaps are defined between the juxtaposed interleaving electrodes of said ring, e. a first generally stationary contact, first conductive support structure extending transversely of said rod electrodes and attached to the distal ends of predetermined rod electrodes of said second plurality, and means for supporting said first generally stationary contact on said first support structure in a position intermediate the locations at which said first support structure is attached to said predetermined rod electrodes of said second plurality, f. a second generally stationary contact, second conductive support structure extending transversely of said rod electrodes and attached to the distal ends of predetermined rod electrodes of said first plurality, and means for supporting said second generally stationary contact on said second support structure in a position intermediate the locations at which said second support structure is attached to said predetermined rod electrodes of said first plurality, g. said first and second stationary contacts being disposed in positions spaced longitudinally of the longitudinally axis of said ring, h. first and second movable contacts within said envelope for respectively engaging said first and second generally stationary contacts, i. a first movable contact rod on which said first contact is mounted extending in sealed relationship through said first metal end cap, j. a second movable contact rod on which said second contact is mounted extending in sealed relationship through said second metal end cap, k. said two pairs of engageable contacts being electrically connected in parallel with each other while said interrupter is closed.

2. The vacuum interrupter of claim 1 in which:

a. said first conductive support structure comprises a first spider having a central portion and arms extending radially outwardly from said central portion, the outer ends of said arms being attached to said predetermined rod electrodes of said second plurality, said first stationary contact being attached to said central portion of said first spider, and b. said second conductive support structure comprises a second spider having a central portion and arms extending radially outwardly from said central portion, the outer ends of the arms of said second spider being attached to said predetermined rod electrodes of said first plurality, said second stationary contact being attached to said central portion of said second spider.

3. The vacuum interrupter of claim 2 in which:

a. said first spider has indentations in its periphery through which the rod electrodes of first plurality of rod electrodes respectively extend with clearance, and b. said second spider has indentations in its periphery through which the rod electrodes of said second plurality of rod electrodes respectively extend with clearance.

4. The vacuum interrupter of claim 1 in which:

a. said predetermined rod electrodes of said second plurality are located generally symmetrically about the periphery of said second movable contact rod, and b. said predetermined rod electrodes of said first plurality are located generally symmetrically about the periphery of said first movable contact rod.

5. The vacuum interrupter of claim 1 in which:

a. a first conductive tube surrounds said first contact rod, is disposed between said first plurality of rod electrodes and said first end cap, and is electrically in series with said predetermined rod electrodes of first plurality of rod electrodes when the interrupter is closed, and b. a second conductive tube surrounds said second contact rod, is disposed between said second plurality of rod electrodes and said second end cap, and is electrically in series with said predetermined rod electrodes of said second plurality when the interrupter is closed.

6. The interrupter of claim 5 in which:

a. said first conductive tube surrounds said first stationary and movable contacts and acts to intercept the relatively large molten particles generated by arcing at said first pair of contacts, and b. said second conductive tube surrounds said second stationary and movable contacts and acts to intercept the relatively large molten particles generated by arcing at said second pair of contacts.

7. The vacuum interrupter of claim 1 in which a conductive tube surrounds said first contact rod, is disposed between said first plurality of rod electrodes and said first end cap, and is electrically connected in series with said predetermined rod electrodes of said first plurality of rod electrodes when the interrupter is closed.

8. The interrupter of claim 7 in which said conductive tube surrounds said first stationary and movable contacts and acts to intercept the relatively large molten particles generated by arcing at said first pair of contacts.

9. The vacuum interrupter of claim 1 in which a conductive tube electrically connected to said first end cap surrounds said first pair of contacts for intercepting the relatively large molten particles generated by arcing at said first pair of contacts.

10. The vacuum interrupter of claim 9 in which a conductive tube electrically connected to said second end cap surrounds said second pair of contacts for intercepting the relatively large molten particles generated by arcing at said second pair of contacts.

* * * * *